United States Patent Office 2,971,333
Patented Feb. 14, 1961

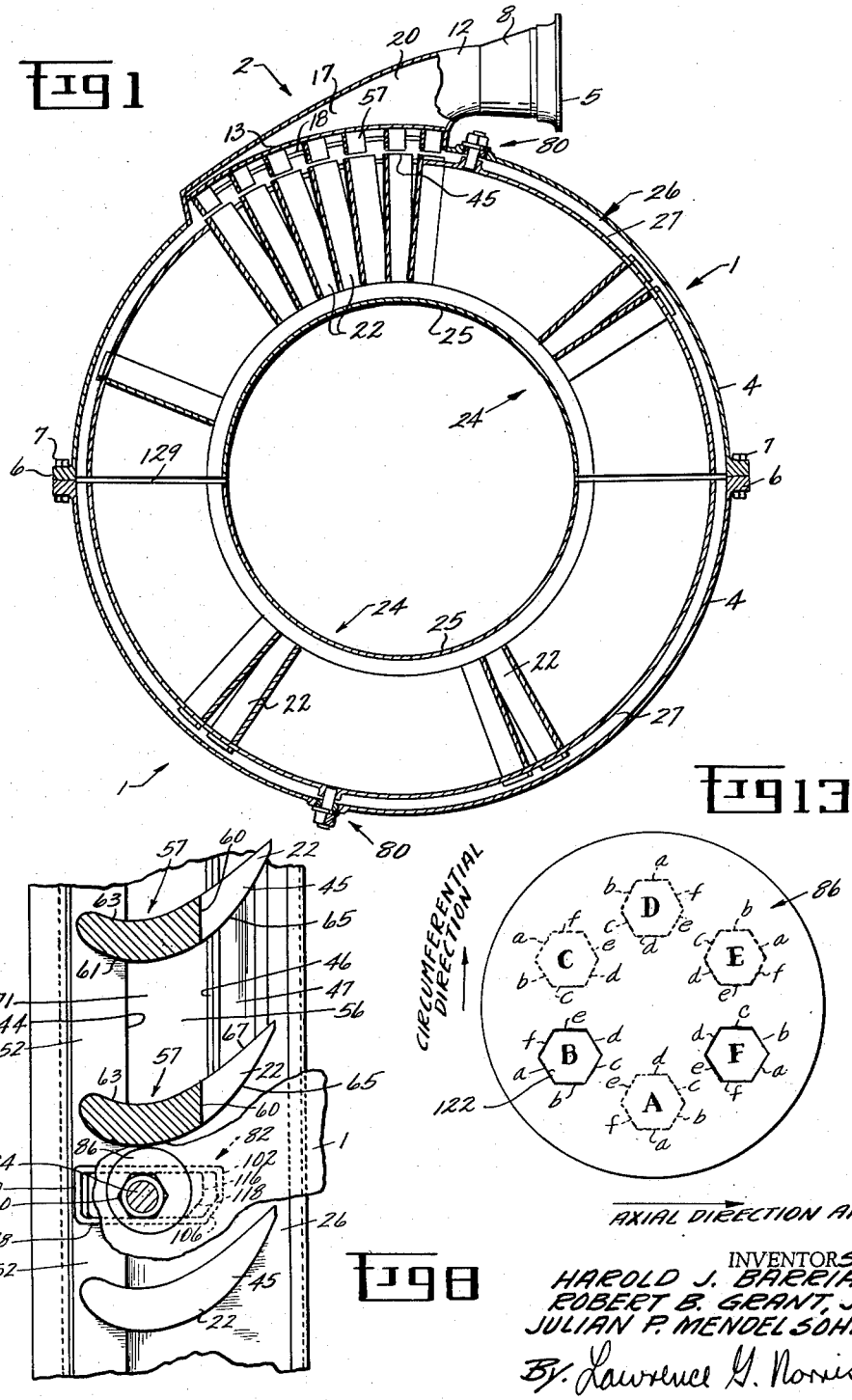

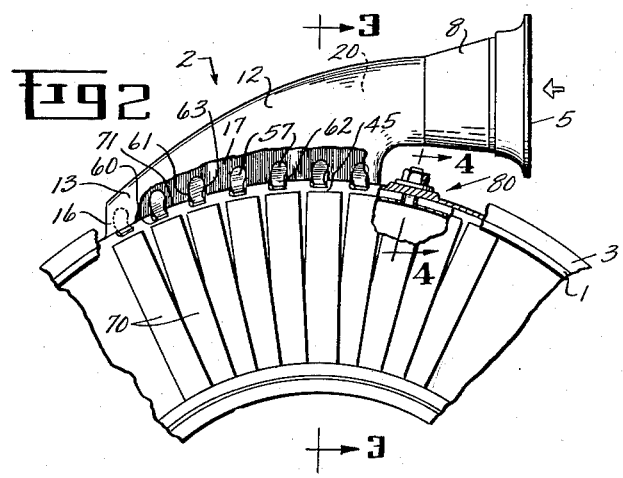
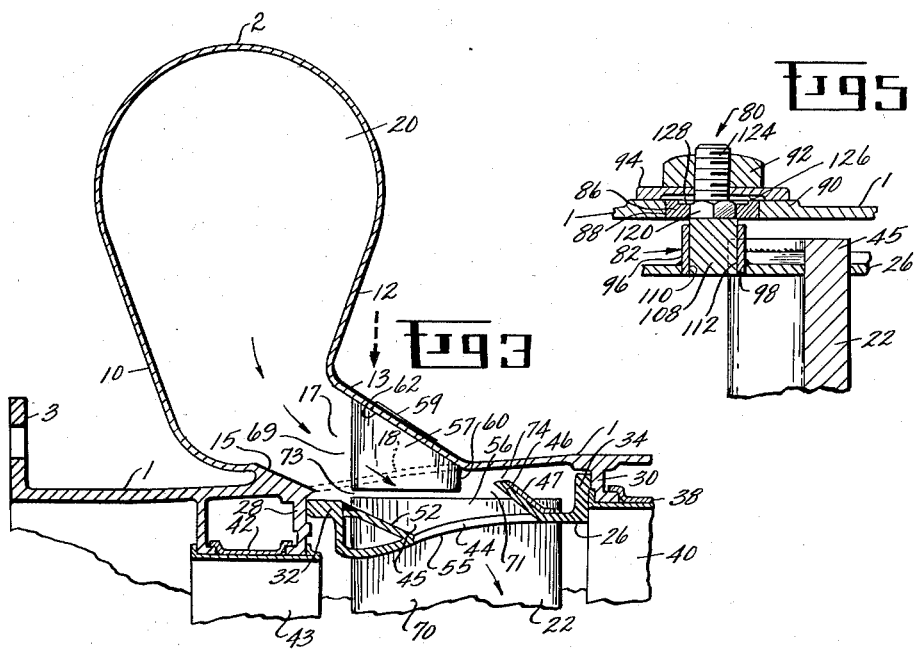
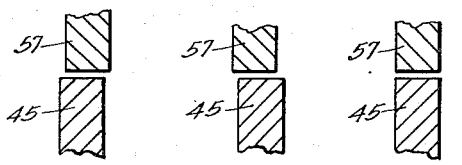
INVENTORS.
HAROLD J. BARRIAL
ROBERT B. GRANT, JR.
JULIAN P. MENDELSOHN
BY Lawrence G. Norris
ATTORNEY

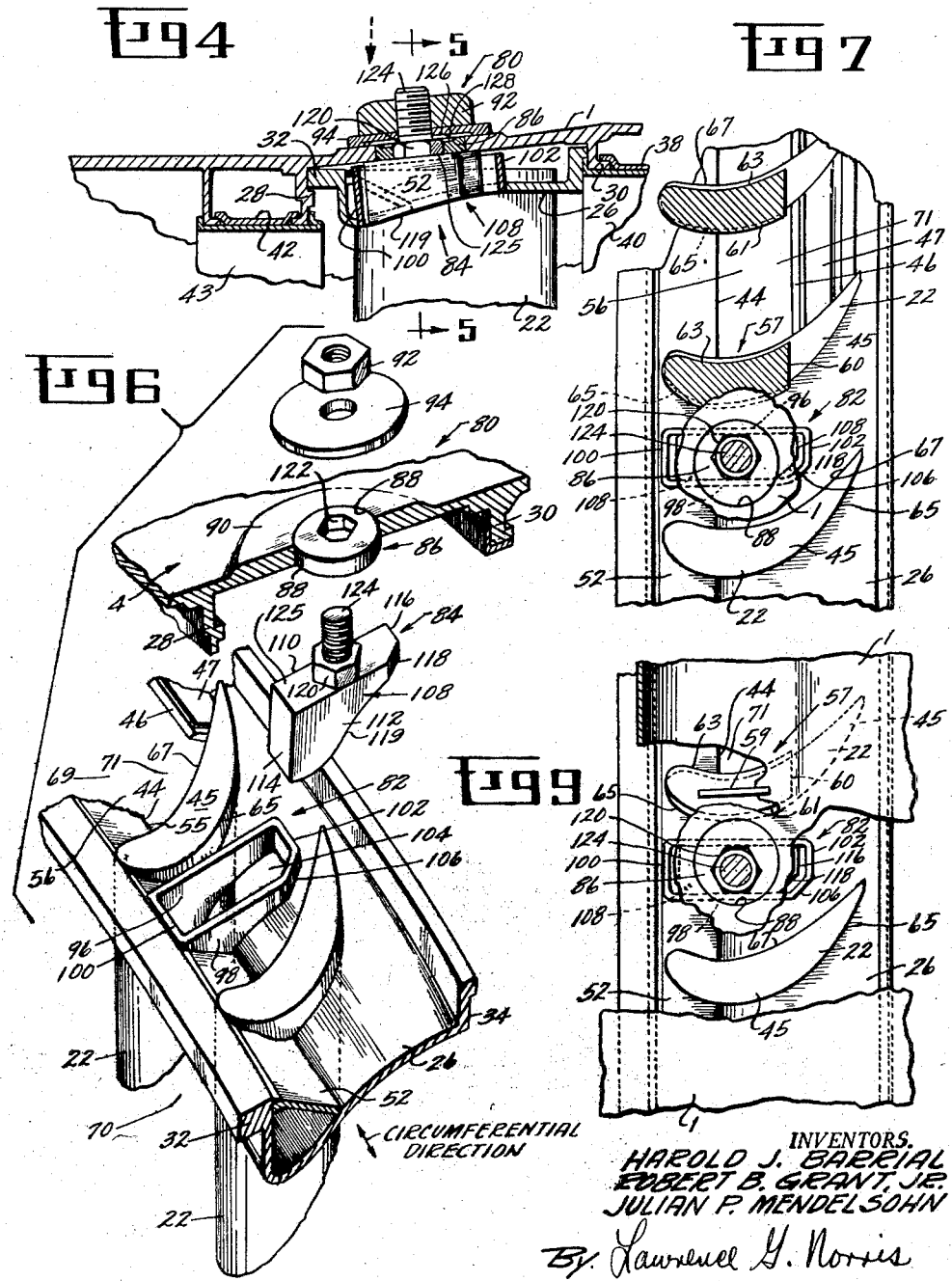

2,971,333
ADJUSTABLE GAS IMPINGEMENT TURBINE NOZZLES

Julian Paul Mendelsohn, Peabody, Robert Barron Grant, Jr., Marblehead, and Harold Joseph Barrial, West Peabody, Mass., assignors to General Electric Company, a corporation of New York Filed May 14, 1958, Ser. No. 735,245

8 Claims. (Cl. 60—39.14)

The present invention relates to an improved adjustable turbine nozzle and more particularly to an improved nozzle adjusting means for the gas impingement starter construction described in U.S. patent application Serial No. 706,743, filed by Jacob Chiera and Bronslaus J. Gedrewicz January 2, 1958, and assigned to the same assignee. The gas impingement starter construction described in the above mentioned application comprises a gas impingement starter nozzle which is located radially outwardly of the turbine nozzle and which has a pair of opposite walls inclined in a direction having an axial and tangential component. In a preferred form, these walls comprise aerodynamic radial extensions of the walls of the turbine nozzle. The turbine nozzle comprises a pair of adjacent turbine nozzle partitions mounted on an inner and an outer nozzle ring or band so that the above mentioned walls of the gas impingement starter nozzle comprise aerodynamic radial extensions of these partitions. The partitions extend radially outwardly through a circumferential slot in the outer band and a pair of opposite walls, inclined in a direction having a radial and axial component and located radially outwardly of the outer band, form the other walls of the gas impingement starter nozzle. The slot and the portions of the partitions located therein form the throat of the gas impingement starter nozzle. Air under pressure flows from a manifold chamber, mounted on the turbine casing, through a circumferential slot in the casing and into the gas impingement starter nozzle which directs it in a direction having a radial, axial and tangential component through the nozzle throat into the turbine nozzles and against the buckets of the turbine wheel at an optimum angle of incidence approximating the exit angle of the turbine nozzle to thereby initiate rotation of the engine and start the engine.

In one of the embodiments shown in the above mentioned application, parts of the radial aerodynamic extensions of the turbine nozzle partitions forming the walls of the gas impingement starter nozzle are physically separated from the turbine nozzle partitions forming the main turbine nozzle. These physically separated extensions are in the form of mating stub blades which comprise stubs of nozzle partitions and therefore have the same contours as such partitions. They are attached permanently to the casing or air manifold wall and extend radially inwardly toward the radially outer ends of the nozzle partitions with which they are aligned. In a preferred embodiment, the end portions of the nozzle partitions extend through, and radially outwardly from, the outer diaphragm for a short distance, the stub blades being aligned with these small end portions and together with such ends portions forming opposite walls of the gas impingement starter nozzle. This arrangement facilitates assembly and disassembly, which is much more difficult when the entire radial extensions forming the gas impingement starter nozzle are integral with the turbine nozzle partitions.

However, this arrangement of necessity leaves a small interruption or gap in the starter nozzle air flow passage. Air leaking through this interruption reduces starter efficiency. The amount by which such efficiency is reduced depends upon the size of the interruption. It is an object of the present invention to minimize the size of the interruption or gap and hence the loss in starter efficiency caused thereby.

In order to minimize the size of the interruption and thus attain maximum starter efficiency, it has been found that it is important to maintain a close circumferential line-up or alignment between the stub blades and the corresponding nozzle partitions because the greater the circumferential misalignment, the greater is the interruption and the less is the starter efficiency. However, it is difficult and time consuming and hence expensive to circumferentially align the stub blades and the nozzle partitions closely enough during manufacture and assembly because to do so requires very close manufacturer's tolerances. Consequently, it is another object of the present invention to provide an inexpensive and simple mechanism for establishing and maintaining close circumferential alignment between the nozzle partitions and their mating stub blades without the necessity of close manufacturing tolerances, whereby assembly and manufacture is facilitated, simplified and reduced in cost.

Another object is to provide such a mechanism having a self locking arrangement for releasably locking it against accidental release.

The nozzle partition assembly referred to in the above mentioned application is a split assembly made up of a pair of semi-cylindrical segments mounted in a split turbine casing by means of cooperating casing rabbets and rabbets on the outer band or ring of the nozzle partition assembly. The adjusting mechanism referred to above is effective to establish and maintain the size and position of the gap or split between the adjacent ends of the two semi-cylindrical segments by establishing and maintaining the circumferential position of each segment, to thereby align the split with the split between the casing halves and permit thermal expansion of the split segments. Consequently, it is another object of the present invention to provide an improved mechanism for establishing and maintaining the split or gap between the segments of a segmental turbine nozzle assembly to permit thermal expansion and to properly position the split.

It is yet another object to provide an improved mechanism for establishing and maintaining the circumferential position of a nozzle assembly with respect to its casing.

The mechanism of this invention in one of its forms comprises a radially extending, tubine nozzle positioning pin which is adapted to be selectively mounted on the turbine casing in a plurality of selected, rotational positions with respect to the casing about an axis extending generally in a radial direction and located laterally of the pin. In a preferred embodiment the pin is mounted eccentrically on, and extends radially from, a mounting member which is in turn adapted to be selectively mounted on the turbine casing in a plurality of selected, rotational positions relative to the casing and about an axis extending generally in a radial direction. In at least some of these rotational positions of the mounting member, the turbine nozzle positioning pin occupies different circumferential positions and in turn positions the turbine nozzle in different circumferential positions. Preferably, the mounting member comprises a bushing mounted in the turbine casing for rotation about the above mentioned axis. When the parts are assembled, the operable connections between the bushing and pin and between the pin and nozzle assembly lock the bushing against rotation out of its selected rotational position. The bushing is rotatable to the above mentioned plurality of rotative positions when the locking pin is disconnected from the nozzle assembly or is disconnected from the bushing. Because the pin is mounted eccentrically on the bushing it will not only occupy different circumferential positions according to the rotational position of the bushing but it will also occupy different axial positions. The connection between the pin and nozzle assembly permits the pin to occupy these different axial positions without any change in the axial position of the nozzle assembly.

Preferably the pin is received in a receptacle in the outer band of the nozzle assembly, the receptacle being oversized in an axial direction to thereby permit the pin to occupy a plurality of axial positions therein but being of a size in a circumferential direction to fit snugly against the opposite sides of the pin to thereby prevent relative circumferential movement therebetween. The receptacle and the part of the pin located therein are irregular in shape to prevent relative rotation therebetween. Preferably the pin is received in an eccentrically located aperture in the bushing, the shape of the aperture and portion of the pin located therein being irregular to prevent relative rotation therebetween but permitting the pin to fit therein in a plurality of rotational positions of the bushing with respect to the pin, the pin always occupying the same rotational position because of its fit in the receptacle.

The above objects and explanation of the invention will be more apparent when read in the light of the accompanying drawings in which the parts are designated specifically but are intended to be regarded as generically as the prior art will permit and in which:

Fig. 1 is a sectional view of one stage of a multi-stage gas turbine section of a small gas turbine engine of the type described in the above mentioned application and which embodies the present invention; Fig. 2 is an aft view in perspective of the same stage as the turbine section of Fig. 1 with parts cut away to show the stub blades and certain other parts in section; Fig. 3 is a view taken along the line 3—3 of Fig. 2; Fig. 4 is a view taken along the line 4—4 of Fig. 2; Fig. 5 is a view taken along the line 5—5 of Fig. 4; Fig. 6 is an exploded view of the aligning mechanism of the present invention showing the adjacent parts of the casing and turbine nozzle diaphragm assembly; Fig. 7 is a top plan view looking in the direction of the arrows shown in dotted lines in Figs. 3 and 4, with parts cut away and with the eccentric bushing occupying a rotational position in which the nozzle partitions and stub blades are slightly misaligned; Fig. 8 is a view similar to Fig. 7 with the eccentric bushing occupying a rotational position in which the nozzle partitions and stub blades are closely aligned so that the interruption between them is reduced to a minimum; Fig. 9 is a view similar to Fig. 7 with the eccentric bushing occupying a rotational position in which the nozzle partitions and stub blades are slightly misaligned in an opposite direction from that shown in Fig. 7; Fig. 10 is a diagrammatic view showing the relative positions of a stub blade and nozzle partition when the eccentric bushing is in the position shown in Fig. 7; Fig. 11 is like Fig. 10 showing the relative positions of the nozzle partition and stub blade when the eccentric bushing is in the position shown in Fig. 9; Fig. 12 is like Fig. 10 showing the relative positions of the nozzle partition and stub blade when the eccentric bushing is in the position shown in Fig. 8; Fig. 13 is a top view of the eccentric bushing in six different rotational positions and referenced with respect to the axial and circumferential directions by means of arrows, the positions of the bushing in which the nozzle partitions and stub blades are closely aligned being shown in full lines and the other positions being shown in dotted lines.

Referring to the figures, 1 is a turbine section of the casing of a gas turbine engine of the type described and shown in the above mentioned United States patent application. The casing section is split and comprises two halves 4 bolted together at flanges 6 by means of bolts 7.

It is attached to a forward section of the engine casing by means of flange 3 and to an aft section of the engine casing by means of another aft flange (not shown).

The top half 4 of casing section 1 has a circumferentially elongated housing 2 integral therewith. The housing has an opening 5 in a neck 8 thereof and an aft side 12 which is inclined in an aft direction at 13 (see Figs. 2 and 3). The inclined wall 13 forms with the inclined surface 1 opposite therefrom a circumferentially elongated hopper-like chamber 17 which communicates with the interior of the casing by means of a circumferentially elongated slot 18 in the casing, the slot being formed at the juncture of the walls of the housing 2 with the casing proper, all as described in the above mentioned application.

A plurality of turbine nozzle partitions 22 are mounted in a split inner annular ring or band 24 (see Fig. 1) made up of two halves or segments 25 and a split outer annular ring or band 26 made up of two halves or segments 27, the outer band being in turn mounted in casing section 1 by means of a pair of annular casing rabbets 28 and 30 (see Figs. 3, 4 and 6) and cooperating outer annular band rabbets 32 and 34. Casing rabbet 30 also supports an end of the shroud 38 (Fig. 3) of the turbine rotor 40 and casing rabbet 28 supports an end of the shroud 42 of the turbine rotor 43 of the preceding stage. The ends of the partitions 22 extend through band 26 and radially outwardly slightly beyond the band at 45.

The portion of ring 26 located approximately under slot 18 in the casing has a circumferentially elongated slot 44 therein which partially overlaps, but is slightly offset in an aft direction from the slot 18, as shown in Fig. 3.

An inclined wall or lip 46 extends from the aft edge of the slot 44 forwardly and radially outwardly and is aligned with the inclined wall 13, as shown. Wall 46 is shown as an upstruck portion of band 26 having a backing member 47 attached thereto.

Another inclined wall 52 extends from the forward edge of slot 44 forwardly and radially outwardly to the rabbet 32 to which it is joined by welding, as shown. Wall 52 is substantially parallel to wall 46 and is aligned with the inclined surface 15, as shown. Wall 52 strengthens the outer band 26 and extends around the entire band whereas wall 46 terminates at the ends of the slot 44 as shown in Figs. 6 to 9. Inclined walls 46 and 52 form a circumferentially elongated hopper-like chamber 56 (Fig. 3) which is aligned with the hopper-like chamber 17 and together with that chamber forms a circumferentially elongated chute 69 which provides communication between the air manifold chamber 20 and the space 70 (Figs. 3 and 6) between the nozzle partitions 22 through the slot 18 in the casing and the slot 44 in the outer band 26, the slot 44 forming the throat or mouth of the chute.

A number of the nozzle partitions 22 are mounted in the slotted portion of the outer band 26 and extend through the slot, as shown, to divide the slot into a number of openings 55 defined by the pressure and suction surfaces 65 and 76 respectively (Figs. 6 to 9) of adjacent nozzle partitions 22 and the forward and aft edges of the slot 44 located therebetween. The end portion 45 of each of these partitions extends radially outwardly into the chute 69, as shown in Figs. 3 and 6.

Each of the nozzle partitions 22 extending through the slot 44 has a stub blade 57 (Figs. 2, 3 and 7 to 12) attached to the inclined wall 13 by means of a fastening key 59. Each stub blade 57 extends radially inwardly into the chute 69, as shown in Fig. 3. The stub blades 57 comprise stubs of nozzle partitions 22 and consequently have the same contours as the nozzle partitions 22 except that a small part of the trailing edges thereof are cut away at 60 to facilitate assembly and the top thereof is inclined at 62 to fit snugly against the inclined wall 13. Each stub blade 57 is radially aligned with a nozzle partition 22 so that its pressure surface 61 (Figs. 2 and 7 to 9)

and suction surface 63, which are identical in contour with the pressure surface 65 and the suction surface 67 respectively of its aligned nozzle partition 22, are radially aligned with the pressure surface 65 and the suction surface 67 respectively of the nozzle partitions (Figs. 3, 8 and 12).

The ends 45 of those partitions 22 extending through slot 44, and their aligned stub blades 57 divide chute 69 into a number of air impingement starter nozzles or nozzle passages 71, each of which is defined by a wall inclined in a direction having an axial and radial component and made up of the aligned walls 46 and 13, an opposite wall also inclined in a direction having an axial and radial component and made up of the two aligned walls 15 and 52, a wall inclined in a direction having an axial and tangential component and made up of the aligned pressure surfaces 61 and 65 of a stub blade and the end portion 45 of its aligned nozzle partition 22 respectively, and an opposite wall also inclined in a direction having an axial and tangential component and made up of the aligned suction surfaces 63 and 67 of an adjacent stub blade and the end portion 45 of its nozzle partition 22 respectively. The openings 55 provided by the slot 44 between adjacent nozzle partitions comprise the throats of the gas impingement starter nozzles.

To start the engine, compressed air is introduced through opening 5 into manifold chamber 20, as shown by the arrows in Fig. 3, and from there it flows through the air impingement nozzle passages 71 and throats 55. It is discharged from the throats in the form of jets into the main nozzle passages 70 between the nozzle partitions 22 and against the buckets of the rotor 40 to initiate rotation of the engine.

The interruptions 73 (Fig. 3) between the radially inner edges of the stub blades 57 and the radially outer edges of ends 45 of the nozzle partitions 22, and the interruption 74 between the radially outer end of the wall 46 and the radially inner end of the wall 13 should be kept at a minimum to avoid loss of starter efficiency. However, a slight interruption cannot be avoided, and in fact, is desirable to provide for thermal expansion.

It is apparent that any circumferential misalignment of the stub blades 57 and the nozzle partitions 22 greatly increases the interruptions referred to above, at the expense of starter efficiency. Furthermore, any circumferential misalignment of the stub blades and nozzle partitions also misaligns the slots 44 and 18 which also results in interruption in air flow, leakage of air, loss of pressure and reduced efficiency. Consequently, it is important that the stub blades and nozzle partitions and the slots 18 and 44 be closely aligned circumferentially.

In order to establish and maintain this close alignment in a simple and inexpensive manner an alignment mechanism 80 is provided for each half of the turbine nozzle assembly.

Each aligning mechanism comprises a generally rectangular shaped receptacle 82 (Fig. 6) in the periphery of each half of the outer ring or band 26, a locking pin or lug 84, mounting means comprising an eccentric bushing 86 received in an aperture 88 in a thickened portion or boss 90 of the casing half 4, and a nut 92 and washer 94 for securing the locking pin or lug in place on the casing.

The receptacle 82 comprises a pair of opposite axially extending walls 96 and 98 and a pair of shorter circumferentially extending walls 100 and 102. These walls extend radially outwardly from the outer ring or band 26 and are open at the top and bottom, as shown in Fig. 6. The opening in the bottom comprises a slot 104 in the diaphragm 26 and the corner formed by the walls 98 and 102 is beveled at 106, as shown, to reduce the proximity of the corner to the adjacent nozzle partition 22.

The locking pin 84 has an enlarged end portion 108 having a cross sectional shape corresponding to the shape of the receptacle 82. This enlarged portion 108 is received by the receptacle 82, as shown, with its elongated walls 110 and 112 extending in an axial direction and snugly received between the elongated, axially extending walls 96 and 98 respectively of the receptacle 82 so that relative circumferential movement between the outer band 26 and the pin 84 is prevented. However, the receptacle is oversized in an axial direction with respect to portion 108 so that axially extending walls 110 and 112 of portion 108 are shorter than the walls 96 and 98 of the receptacle. Consequently, enlarged portion 108 is adapted to be located in a plurality of axial positions within the receptacle and with respect to the outer ring or band 26.

The radially inner end 119 of portion 108 conforms to the contour of the radially inner surface of the outer band 26 so that it blends together with the adjacent portions of such surface to provide an uninterrupted surface for the passage of exhaust gases.

Pin 84 is eccentrically mounted on bushing 86 by means of a hexagonal portion 120, which extends radially outwardly from enlarged portion 108 and which is received in the hexagonal shaped aperture 122, which is eccentrically located in the bushing 86.

The hexagonal portion 120 extends radially outwardly into a threaded shank portion 124 which cooperates with nut 92 and washer 94 to fasten the pin 84 to the casing with the shoulder 125 formed at the juncture of hexagonal portion 120 and enlarged portion 108 drawn snugly against the radially inner surface of the bushing 86 and the adjacent inner surface of the casing 1 (Figs. 4 and 5). The radially inner surface of the washer 94 and the radially outer surface of the bushing 86 have recesses 126 and 128 therein respectively facing each other, as shown. This permits the shoulder 125 to be drawn snugly against the radially inner surface of the casing and the radially inner surface of the bushing with the two surfaces in alignment with each other, as shown without requiring extreme accuracy in the radial dimension of the bushing.

The rectangular contour of the receptacle 82 and enlarged portion 108 received therein prevents relative rotation and relative circumferential movement therebetween while permitting the enlarged portion 108 to occupy a plurality of axial positions with respect to the receptacle. Consequently, the pin is locked against rotation because the receptacle is integral with the nozzle assembly and cannot be rotated.

The hexagonal shape of the portion 120 of the pin 84 and the aperture 122 in the bushing prevents relative rotation therebetween while permitting the portion 120 to be received in the aperture in a plurality of rotational positions of the bushing 86 without changing the rotational position of the pin, which remains the same in all rotative positions of the bushing. Consequently, the bushing is locked against rotation in the casing aperture 88 because the pin cannot rotate as aforesaid.

Thus, when the parts are assembled, as shown, the connection between the nozzle assembly and the pin and between the pin and the bushing locks the bushing in the particular rotative position which it occupies, whereby the pin and nozzle assembly are locked in the particular circumferential positions they occupy. The irregular shape of the portion 120 of the pin and the aperture 122 and the irregular shape of the receptacle and portion 108 of the pin not only cooperate to provide a self-locking arrangement which locks the mechanism against accidental release by locking the bushing against rotation, but they also prevent rotation of the bushing out of its adjusted position when tightening the nut 92.

It is apparent that the circumferential position of the pin 84, and hence the nozzle assembly, with respect to the casing depend upon the rotational position of the bushing 86 in its aperture 88. Thus, by changing the rotational position of the bushing 84 in its aperture 88, the circumferential position of the pin 84, and hence the nozzle assembly circumferentially positioned thereby are changed. In this manner the nozzle assembly can be adjusted to a plurality of circumferential positions.

The rotational position of the bushing can be changed by first disconnecting it from the pin by removing the hexagonal portion 120 from the hexagonal aperture 122, whereafter the bushing is rotated to a new position and the nozzle assembly and pin are moved in a circumferential direction (the pin is at the same time moved axially) until the portion 120 of the pin can again be reinserted into the aperture 122 of the bushing in its new rotational position, whereupon the bushing is locked in its new rotational position and the pin and nozzle assembly are locked in their new circumferential positions.

Fig. 13 shows the bushing rotatably positioned in six different rotational positions in which the aperture 122, having the walls a, b, c, d, e and f, and hence the pin 84 received in the aperture, occupy positions A, B, C, D, E and F, positions B and F being shown in full lines and the other positions being shown in dotted lines. Of these six different positions of aperture 122 and pin 84, only four differ circumferentially because in positions E and C and in positions B and F the circumferential position is the same. The axial location of the aperture 122 and hence the pin 84 also varies in the different positions thereof. Since the axial positions are the same for positions C and B, for positions A and D and for positions E and F, the aperture and pin occupy three different axial positions. Note that the rotational position of the aperture is different for each position, such aperture being rotated 360° from position A back to position A. The hexagonal portion 120 of the pin fits in the aperture in each of these six positions without rotation of the pin.

It is apparent that since the rotational position of the pin is the same in all positions due to the rectangular shape of the portion 108 and the receptacle 82, the hexagonal portion 120 does not fit in the aperture 122 when the rotational position of the bushing is such that the aperture 122 is intermediate any two adjacent positions shown. Thus, when the portion 120 and the aperture 122 are hexagonal in shape, the number of possible rotational positions of the pin 84 is limited to six and the number of circumferential positions to which the pin, and hence the nozzle assembly half, can be adjusted is limited. By increasing the number of sides of the aperture and section 120 of the pin, the number of different circumferential positions to which the nozzle assembly can be adjusted can be increased.

Since the nozzle assembly half cannot move appreciably in an axial direction due to the abutment of diaphragm rabbets 32 and 34 against the casing rabbets 28 and 30, the receptacle 82 must be oversized in an axial direction to permit the pin 84 to occupy the plurality of axial positions which it must occupy in order for it to occupy the plurality of circumferential positions referred to above.

In assembling the unit, each assembled turbine nozzle diaphragm half, made up of a half 24 of the inner band, the corresponding half 27 of the outer band and the nozzle partitions 22 mounted thereon, is slid circumferentially into its casing half and is positioned circumferentially so that the stub blades 57 and their corresponding nozzle partitions 22 are approximately aligned. The pin 84 is then inserted into the receptacle 82 from inside the outer band 26 and the bushing 86 is rotated to a position in which the hexagonal portion 120 of the pin fits within the hexagonal aperture 122 with the nozzle diaphragm half in the position referred to above. When this is done, suppose that the bushing occupies a rotational position in which the aperture is in A position (Fig. 13) in which the parts are locked in the positions shown in Figs. 9 and 11 with the stub blades 57 and nozzle partitions 22 slightly misaligned circumferentially, as shown. In such case, the pin 84 is moved radially inwardly until the hexagonal portion 120 moves out of the aperture 122, whereafter the bushing is rotated until the aperture moves to position D. The nozzle diaphragm half is then slid slightly in a circumferential direction (upwardly as viewed in Fig. 9) until the portion 120 of the pin, when the portion 108 thereof is inserted in the receptacle 82, fits within the aperture 122 in position D. The parts are now locked in the position shown in Figs. 7 and 10 with the nozzle partitions misaligned in an opposite direction from that of position A. The pin is again moved radially inwardly until portion 120 is again removed from the aperture 122 and the bushing is then rotated back to position B. The nozzle diaphragm half is again moved circumferentially until the hexagonal portion 120 of the pin, when the portion 108 thereof is inserted in receptacle 82, again fits in the hexagonal aperture 122. In this position, as shown in Figs. 8 and 12, the parts are locked in a position in which the nozzle partitions are closely aligned with the stub blades. The pin is then fastened in place by the nut 92 and washer 94.

The other half of the nozzle assembly is then positioned circumferentially by its aligning mechanism, which is identical to the aligning mechanism described above, to establish and maintain the proper spacing between the adjacent ends 129 (Fig. 1) of the two halves of the nozzle diaphragm assembly to permit thermal expansion and to assure alignment of the nozzle assembly split 129 with the casing split.

The difference in the circumferential position of each nozzle assembly half resulting from changing the rotational position of its bushing from one of its rotational positions to an adjacent position depends on the distance which the aperture is offset from the center of the bushing and on the total number of rotational positions and can be made as small as desired.

The range of adjustability of the circumferential position of each half of the nozzle assembly is determined by the circumferential distance between the extreme positions A and D and can be varied considerably.

The magnitude of the manufacturing tolerances which can be tolerated is substantially increased with the use of the above described mechanism because it is only necessary to achieve sufficient accuracy to obtain close alignment somewhere between the extreme circumferential positions A and D of the aperture 122.

Although in the drawings the mounting member on which the pin 84 is eccentrically mounted is shown as a cylindrical bushing 86, its shape may vary so long as it can be selectively mounted on the casing in a plurality of selected rotational positions with respect to the casing and about an axis extending generally in a radial direction. For example, it can have the shape of a polygon, in which case the aperture 122 and part 120 of the pin can be round. As a matter of fact, any means for selectively mounting the pin on the casing in a plurality of selected rotative positions with respect to the casing and about a generally radially extending axis spaced laterally from the pin, can be used in place of the eccentric bushing. Furthermore, instead of a single bushing rotatable to a plurality of rotational positions in the aperture 88, a plurality of interchangeable bushings can be used each of which has an aperture, corresponding to 122, eccentrically located at a different distance from its radially extending center axis. In such case the circumferential position of the nozzle assembly is adjusted by changing the bushing, the apertures 122 of the different bushings, and hence the pin when positioned in such apertures, being located on a straight circumferentially extending line.

While a particular embodiment of the present invention has been illustrated and described, it will be obvious to those skilled in the art that various changes and modifications may be made without departing from the invention. It is intended to cover in the appended claims all such changes and modifications which come within the true scope and spirit of the invention.

We claim:
1. In a turbine, a turbine nozzle assembly and a casing in which said assembly is mounted, means for establishing and maintaining the circumferential position of said nozzle assembly with respect to said casing, said last mentioned means comprising pin means extending in a radial direction for circumferentially positioning said nozzle assembly and means for selectively mounting said pin means on said casing in a plurality of rotational positions with respect to an axis extending generally in a radial direction and spaced laterally from said pin means, said pin means occupying different circumferential positions with respect to said casing in at least some of said rotational positions.

2. In a turbine, a turbine nozzle assembly and a casing in which said assembly is mounted, means for establishing and maintaining the circumferential position of said nozzle assembly with respect to said casing, said last mentioned means comprising a mounting member, pin means engaging said mounting member and extending therefrom generally in a radial direction for engaging and circumferentially positioning said turbine nozzle assembly, and means for selectively mounting said mounting member on said casing in a plurality of rotational positions with respect to said casing and about an axis extending generally in a radial direction and offset from said pin means, said pin means and hence said turbine nozzle assembly occupying different circumferential positions in at least some of said positions of said mounting member, whereby the circumferential position of said turbine nozzle assembly is determined by the rotational position of said mounting member.

3. A nozzle assembly according to claim 2, said mounting member being releasably locked in each of said rotational positions by its interconnection with said turbine nozzle assembly through said pin means and being rotatable to said positions when it is disconnected from said turbine nozzle assembly through said pin means.

4. A turbine nozzle assembly according to claim 2 said turbine nozzle comprising a plurality of nozzle assembly partitions mounted on an outer and inner nozzle diaphragm, said turbine nozzle assembly being formed by circumferentially spaced partitions, said outer diaphragm having a receptacle for receiving a portion of said pin means to restrain said pin means against rotation with respect to said turbine nozzle assembly.

5. A turbine nozzle assembly according to claim 2, said mounting member comprising a bushing mounted in said casing for rotation about said axis to said plurality of rotative positions, said bushing having an aperture therein located eccentrically with respect to said axis, said pin means received in said aperture, the shape of said aperture in said bushing and the part of said pin means received therein cooperating to prevent rotation of said bushing and said pin means with relation to each other when said part of said pin means is received in said aperture, said bushing being rotatable to said positions when said pin means is removed from said aperture, said pin means fitting in said aperture in each of said plurality of rotational positions of said bushing.

6. In a turbine, a turbine nozzle assembly and a casing in which said nozzle asesmbly is mounted, pin means engaging and circumferentially positioning said nozzle assembly in said casing, a bushing rotatably mounted in the wall of said casing with its axis extending generally in a radial direction, and fastening means releasably securing said pin means in said bushing eccentrically to the axis thereof, said pin means extending radially from said bushing into engagement with said nozzle assembly for adjustably positioning said nozzle assembly in said casing.

7. In a turbine comprising a casing having annular casing rabbets, a turbine nozzle assembly split into segments and mounted in said casing, said nozzle assembly comprising an outer nozzle band split into segments, an inner nozzle band split into segments and a plurality of nozzle partitions mounted in said nozzle band, said outer band having annular rabbets, said nozzle assembly being supported in said casing by means of said casing rabbets and said outer band rabbets, means for adjusting the circumferential position of each segment of said nozzle assembly relative to said casing, said last mentioned means comprising a mounting member, pin means mounted eccentrically on said mounting member and extending radially inwardly therefrom to engage a segment of said nozzle assembly and position said segment circumferentially with respect to said casing, means for selectively mounting said mounting member on said casing in a plurality of selected rotational positions with respect to said casing and about an axis extending generally in a radial direction, said pin means occupying different circumferential positions in at least some of said rotational positions of said mounting member, whereby the circumferential position of said pin means and hence said segment is determined by the selected rotational position of the mounting member.

8. A turbine nozzle assembly comprising a cylindrical casing, a turbine nozzle, a gas impingement starter nozzle comprising an aerodynamic radial extension of said turbine nozzle, at least a part of said radial extension being physically separated from said turbine nozzle and affixed to said casing, and supporting means for securing said turbine nozzle adjustably in said casing for circumferential alignment with said radial extension; said supporting means comprising pin means engaging said nozzle assembly and extending along a first radial axis, bushing means, fastening means releasably securing said bushing means in a plurality of rotational positions about a second radial axis, said fastening means securing said pin means in said bushing means with said first and said second radial axes laterally offset.

References Cited in the file of this patent
UNITED STATES PATENTS

| | | |
|---|---|---|
| 1,289,960 | Taylor | Dec. 31, 1918 |
| 2,457,833 | Redding | Jan. 4, 1949 |
| 2,714,802 | Wosika | Aug. 9, 1955 |
| 2,862,357 | Haworth | Dec. 2, 1958 |

FOREIGN PATENTS

| | | |
|---|---|---|
| 615,689 | Great Britain | Jan. 10, 1949 |